US010447817B2

(12) United States Patent
Segalovich et al.

(10) Patent No.: US 10,447,817 B2
(45) Date of Patent: Oct. 15, 2019

(54) METHOD OF AND SYSTEM FOR PROVIDING INFORMATION TO A USER OF A CLIENT DEVICE

(71) Applicant: YANDEX EUROPE AG, Lucerne (CH)

(72) Inventors: Ilya Valentinovich Segalovich, Moscow (RU); Konstantin Pavlovitch Gorskiy, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 635 days.

(21) Appl. No.: 14/433,024

(22) PCT Filed: Oct. 1, 2013

(86) PCT No.: PCT/US2013/062795
§ 371 (c)(1),
(2) Date: Apr. 1, 2015

(87) PCT Pub. No.: WO2014/055468
PCT Pub. Date: Apr. 10, 2014

(65) Prior Publication Data
US 2016/0057251 A1 Feb. 25, 2016

(30) Foreign Application Priority Data

Oct. 1, 2012 (WO) ................. PCT/RU2012/000798
Apr. 1, 2013 (RU) ................................ 2013115567

(51) Int. Cl.
*H04L 29/08* (2006.01)
(52) U.S. Cl.
CPC .............. *H04L 67/36* (2013.01); *H04L 67/02* (2013.01); *H04L 67/20* (2013.01)

(58) Field of Classification Search
USPC ................................. 709/201–203, 218, 236
See application file for complete search history.

(56) References Cited

U.S. PATENT DOCUMENTS 6,667,751 B1 * 12/2003 Wynn ............... G06F 17/30876
707/E17.112
7,594,193 B2   9/2009 Thomas
(Continued)

OTHER PUBLICATIONS

Anonymous, Omnibox—The Chromium Projects, Sep. 19, 2012 (Sep. 19, 2012), XP055272426. https://web.archive.org/web/20120919021027/http://www.chromium.org/user-experience/omnibox.*

(Continued)

*Primary Examiner* — Younes Naji
*Assistant Examiner* — Da T Ton
(74) *Attorney, Agent, or Firm* — BCF LLP (57) ABSTRACT

Method comprising: displaying, on a screen of the client device, a browser having an address bar; receiving, from a user of the client device via the browser, an indication of an network resource to be furnished to the client device; sending, from the client device to at least one server, a request to furnish the network resource to the client device; receiving, by the client device from the at least one server, at least one of the network resource and information regarding the network resource. Also, method comprising: receiving, by at least one server from the client device via the browser, an indication of an network resource to be furnished to the client device; and sending, by the at least one server to the client device, information from other than the publisher of the net work resource to be displayed within the address bar of the browser.

20 Claims, 7 Drawing Sheets

(56) References Cited

U.S. PATENT DOCUMENTS

| | | | |
|---|---|---|---|
| 7,743,254 B2 | 6/2010 | Sauve | |
| 2004/0030784 A1* | 2/2004 | Abdulhayoglu | G06F 17/30861 709/227 |
| 2005/0273723 A1* | 12/2005 | Sharpe | A61F 5/03 715/764 |
| 2006/0253489 A1 | 11/2006 | Kahn et al. | |
| 2008/0189654 A1* | 8/2008 | Thomas | G06F 16/9535 715/805 |
| 2010/0275024 A1 | 10/2010 | Abdulhayoglu | |
| 2012/0323898 A1* | 12/2012 | Kumar | G06Q 30/0251 707/723 |

OTHER PUBLICATIONS

Anonymous, Omnibox—The Chromium Projects, Sep. 19, 2012 (Sep. 19, 2012), XP055272426. https://web.archive.org/web/20120919021027/http://www.chromium.org/user-experience/omnibox, retrieved on May 12, 2016.

Anonymous, Address bar—Wikipedia. the 1-15 free encyclopedia, Jun. 14, 2012 (Jun. 14, 2012), XP055272400, https://en.wikipedia.org/w/index.php?title=Address_bar&oldid=497574218, retrieved on May 12, 2016.

Chrome Help Center's channel, Chrome-Omni box, Jul. 19, 2012 (Jul. 19, 2012), pp. 1-2, XP054976532, https://www.youtube.com/watch?v=mA3adV-aLLk, retrieved on May 19, 2016.

Supplementary European Search report from EP 13843619, dated May 25, 2016, Florou, Rafaella.

Microsoft Corporation. Internet Explorer 9 features: Compatibility View. Microsoft Corporation; Sep. 26, 2012; Retrieved on: Mar. 21, 20141 from internet: <URL: http://web.archive.org/web120120926004400/http://windows.microsoft.com/en-US/internet-explorer/products/ie-9/features/compatibility-view>.

International Search Report from PCT/US2013/062795; Blaine R. Copenheaver; dated Apr. 17, 2014.

* cited by examiner

METHOD OF AND SYSTEM FOR PROVIDING INFORMATION TO A USER OF A CLIENT DEVICE

CROSS-REFERENCE

The present application claims convention priority to (1) International Patent Application No. PCT/RU2012/000798, filed Oct. 1, 2012, entitled "Method of and System for Providing Information to a User of a Client Device"; and to (2) Russian Patent Application No. 2013115567, filed Apr. 1, 2013, entitled "Method of and System for Providing Information to a User of a Client Device". These applications are incorporated by reference herein in their entirety. The following applications are also incorporated by reference herein in their entirety: (1) International Application No. PCT/RU2012/000801, filed Oct. 1, 2012, entitled "Methods, Systems And Programs For Retrieving Information On The Internet"; (2) International Application No. PCT/RU2012/000800, filed Oct. 1, 2012, entitled "Method and System for Navigating to a Sub-Resource of an Internet Resource"; (3) International Application No. PCT/RU2012/000799, filed Oct. 1, 2012, entitled "Method and Browser for Displaying Overlaid Webpages"; (4) Russian Patent Application No. 2013115564, filed Apr. 1, 2013, entitled "Methods, Systems And Programs For Retrieving Information On The Internet"; (5) Russian Patent Application No. 2013115566, filed Apr. 1, 2013, entitled "Method and System for Navigating to a Sub-Resource of an Internet Resource"; and (6) Russian Patent Application No. 2013115565, filed Apr. 1, 2013, entitled "Method and Browser for Displaying Overlaid Webpages".

FIELD

The present specification relates to methods of and systems for providing information to users of client devices.

BACKGROUND

A browser is a software application for retrieving, presenting and traversing information resources on a network ("network resources"). Typically, the network is the Internet and the network resources are Internet resources on the World Wide Web, but this is not always the case. Browsers, can, for example, be used to access network resources on a local network, e.g. an intranet site, irrespective of whether that local network is connected to the Internet.

A network resource is identified by a Uniform Resource Locator (URL). The network resource may be, for example, a web page, an image, a video, an audio file, a text document or any number of other pieces of content. Hyperlinks present in resources enable users to easily navigate their browsers to related resources.

Figure 1:
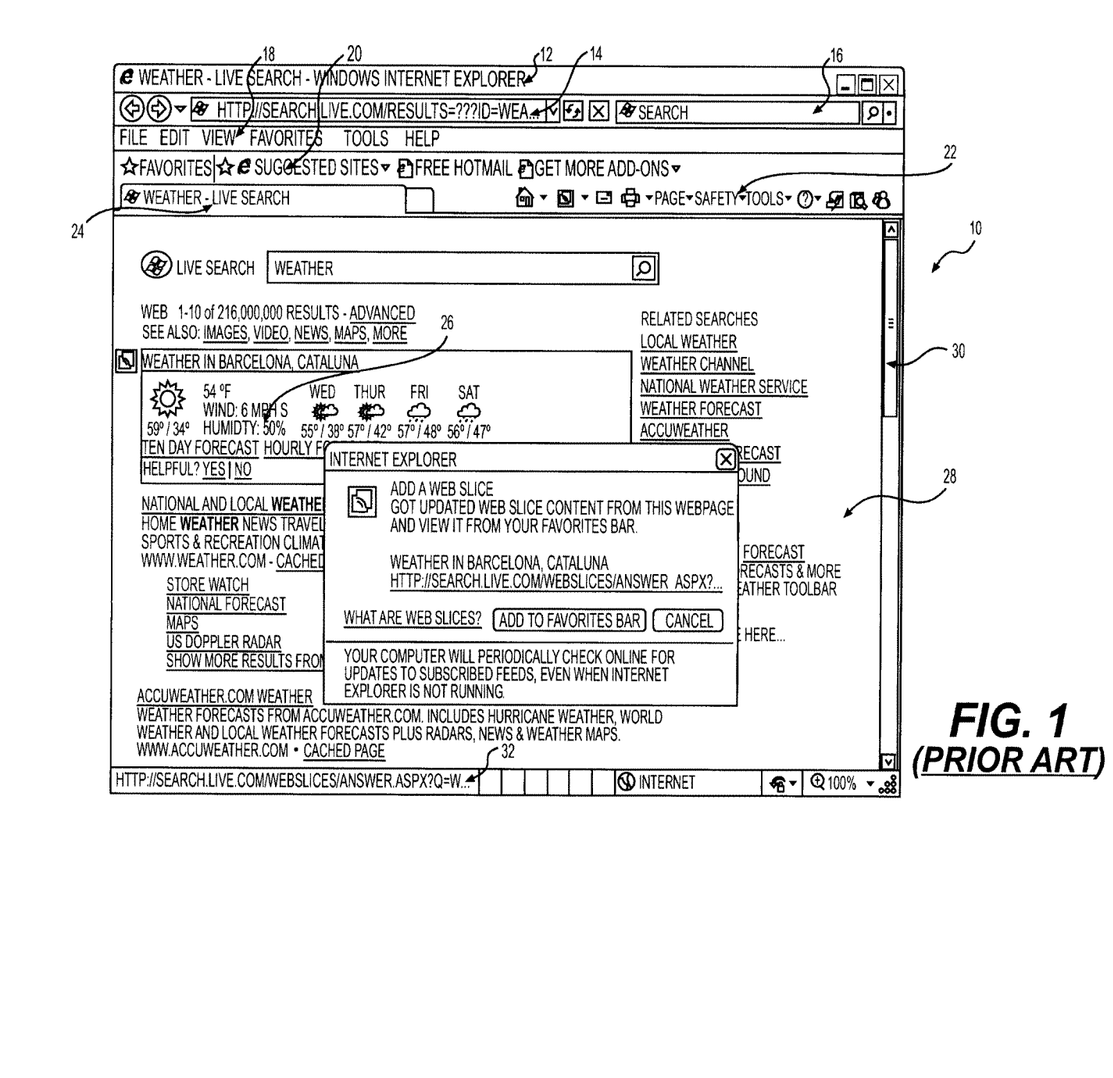
FIG. 1 is a view of a prior art browser.

FIG. 1 shows a screen shot of a prior art Microsoft™ Internet Explorer™ browser 10, which illustrates some common conventional elements of a browser window: the title bar 12, the address bar 14, the search bar 16, the menu bar 18, the links bar 20, a tool bar 22, a tab 24, the display window 26, a pop-up window 28, the vertical scroll bar 30, and the status bar 32. The foregoing examples are merely exemplary and are not intended to be limited with respect to the definition of a browser. Conventional browsers may have more, less and/or different elements than the foregoing.

Browsers have been in existence for a relatively short period of time (approximately 20 years before the filing date of the present application), and thus, while they are generally adequate for their intended purpose, given their relative youth, improvements are nonetheless possible.

SUMMARY

It is an object of the technology disclosed in the present specification to provide an improved browser.

In this respect, in conventional browsers, the address bar is an element of the browser that either shows the then current URL or accepts a typed URL that the user wishes to go on. In some conventional browsers the address bar may also serve as a search bar, however, for purposes of the present specification, those functions are considered to be those of a search bar (that in that case also happens to be the address bar) and not of the address bar.

The present technology provides for an improvement an address bar having expanded functionality in that, in addition to showing the then current URL or accepting a typed URL that the user wishes to go on, the address bar can serve to display information to a user of the client device (i.e. the device on which the browser is then functioning), the information from other than from the publisher of the then current network resource whose URL is then currently being shown in the address bar. Depending on the capabilities of the browser, using the address bar in this fashion may allow for the publisher of the browser to cause the browser in displaying information that the publisher of the browser desires to be displayed.

Thus, in one aspect, some embodiments of the present technology provide a method of providing information to a user of a client device, the method comprising:

displaying, on a screen of the client device, a browser having an address bar;

receiving, from a user of the client device via the browser, an indication of an network resource to be furnished to the client device;

sending, from the client device to at least one server, a request to furnish the network resource to the client device;

receiving, by the client device from the at least one server, at least one of the network resource and information regarding the network resource;

displaying, on the screen of the client device, within the address bar of the browser, information from other than the publisher of the network resource.

In another aspect, some embodiments of the present technology provide a system for providing information to a user of a client device, the system comprising the client device, the client device including:

a computer processor;

a screen operationally connected with the computer processor;

a user interface operationally connected with the computer processor;

a communication interface operationally connected with the computer processor and structured and configured to communicate with at least one server;

a non-transient computer information storage device operationally connected with the computer processor, the information storage device storing instructions that when executed by the computer processor effect:

a display, on a screen of the client device, of a browser having an address bar;

a receiving, from a user of the client device via the browser, of an indication of an network resource to be furnished to the client device;

a sending, from the client device to the at least one server, of a request to furnish the network resource to the client device;

a receiving, by the client device from the at least one server, of at least one of the network resource and information regarding the network resource;

a display, on the screen of the client device, within the address bar of the browser, of information from other than the publisher of the network resource.

In another aspect, some embodiments of the present technology provide a non-transient computer information storage medium storing instructions that when executed by a computer processor of a client device effect:

a display, on a screen of the client device, of a browser having an address bar;

a receiving, from a user of the client device via the browser, of an indication of an network resource to be furnished to the client device;

a sending, from the client device to at least one server, of a request to furnish the network resource to the client device;

a receiving, by the client device from the at least one server, of at least one of the network resource and information regarding the network resource;

a display, on the screen of the client device, within the address bar of the browser, of information from other than the publisher of the network resource.

The information other than from the publisher of the then current network resource may either be displayed in the address bar with the entire of the then current URL, with a part of the then current URL, or in place of the then current URL. Thus, in some embodiments, (a) receiving, by the client device from the at least one server, (of) at least one of the network resource and information regarding the network resource, is, (a) receiving, by the client device from the at least one server, (of) the network resource; and the method further comprises (or the information storage device/medium further stores instructions that when executed by the computer processor effect—as the case may be), (a) displaying (of) the network resource within the browser on the screen of the client device, and (a) displaying (of) a uniform resource locator (URL) of the network resource within the address bar of the browser on the screen of the client device; and (a) displaying, on the screen of the client device, within the address bar of the browser, (of) information from other than the publisher of the network resource, is (a) displaying, on the screen of the client device, within the address bar of the browser (of) information from other than the publisher of the network resource, while displaying at least part of the URL of the network resource within the address bar of the browser.

And, in other embodiments, (a) receiving, by the client device from the at least one server, (of) at least one of the network resource and information regarding the network resource, is, receiving, by the client device from the at least one server, the network resource; and the method further comprises (or the information storage device/medium further stores instructions that when executed by the computer processor effect—as the case may be), (a) displaying (of) the network resource within the browser on the screen of the client device, and (a) displaying (of) a URL of the network resource within the address bar of the browser on the screen of the client device; and (a) displaying, on the screen of the client device, within the address bar of the browser, (of) information from other than the publisher of the network resource, is (a) displaying, on the screen of the client device, within the address bar of the browser (of) information from other than the publisher of the network resource in place of the URL of the network resource within the address bar of the browser.

The information other than from the publisher of the then current network resource may continue to be displayed (e.g. until a certain event occurs—for example, the navigation by the user away from the then current network resource) or may cease to be displayed (e.g. after a certain period of time). Thus, in some embodiments, the method further comprises (or the information storage device/medium further stores instructions that when executed by the computer processor effect—as the case may be), ceasing to display (a ceasing of display of) the additional information in the address bar.

The user of the client device may or may not be able to interact with the information other than from the publisher of the then current network resource. Thus, in some embodiments, the information from other than the publisher of the network resource includes information regarding at least one user-selectable object; and the method further comprises (or the information storage device/medium further stores instructions that when executed by the computer processor effect—as the case may be), (a) taking (of) an action via the client device as a consequence of the user selecting at least one of the at least one user-selectable object. And, in some embodiments, the information from other than the publisher of the network resource includes information regarding at least one object capable of receiving input from the user; and the method further comprises (or the information storage device/medium further stores instructions that when executed by the computer processor effect—as the case may be), (a) taking (of) an action via the client device as a consequence of user input into at least one of the at least one object.

The information other than from the publisher of the then current network resource may be received by the client device from the server(s) from which the client device received the then current network resource. Thus, in some embodiments, the information from other than the publisher of the network resource is received via, at least in part, the at least one server.

This is not necessarily the case however, and the information other than from the publisher of the then current network resource may be received from different server(s) from which the client device has received the then current network resource. Thus, in some embodiments, the at least one server is a first server; and the method further comprises (or the information storage device/medium further stores instructions that when executed by the computer processor effect—as the case may be), prior to (a) displaying on the screen of the client device within the address bar of the browser (of) information from other than the publisher of the network resource (a) sending, from the client device to a second server, (of) a request for the information from other than the publisher of the network resource; and (a) receiving, by the client device from the second server, (of) the information from other than the publisher of the network resource.

The browser itself may use the address bar as location within which to display information, such as warnings, advice, requests for information, notices, requests to install an update or a plug-in, etc. Thus, in some embodiments, the information from other than the publisher of the network resource is generated by, at least in part, the browser.

In another aspect, some embodiments of the present technology provide a method of providing information to a user of a client device having a browser, the method comprising:
 receiving, by at least one server from the client device via the browser, an indication of an network resource to be furnished to the client device; and
 sending, by the at least one server to the client device, information from other than the publisher of the network resource to be displayed within the address bar of the browser.

In another aspect, some embodiments of the present technology provide a system for providing information to a user of a client device, the system comprising at least one server, the at least one server including:
 a computer processor;
 a communication interface operationally connected with the computer processor and structured and configured to communicate with the client device;
 a non-transient computer information storage device operationally connected with the computer processor, the information storage device storing instructions that when executed by the computer processor effect:
  a receiving, by the at least one server from the client device via the browser, of an indication of an network resource to be furnished to the client device; and
  a sending, by the at least one server to the client device, of information from other than the publisher of the network resource to be displayed within the address bar of the browser.

In another aspect, some embodiments of the present technology provide a non-transient computer information storage medium storing instructions that when executed by a computer processor of at least one server effect:
 a receiving, by at least one server from the client device via the browser, of an indication of an network resource to be furnished to the client device; and
 a sending, by the at least one server to the client device, of information from other than the publisher of the network resource to be displayed within the address bar of the browser.

The user of the client device may or may not be able to interact with the information other than from the publisher of the then current network resource, and an action may be taken via the server in consequence. Thus, in some embodiments, the information from other than the publisher of the network resource includes information regarding at least one user-selectable object; and the method further comprises (or the information storage device/medium further stores instructions that when executed by the computer processor effect—as the case may be), (a) receiving, by the at least one server from the client device, (of) an indication that at least one of the at least one user-selected object has been selected. In some embodiments, the information from other than the publisher of the network resource includes information respecting at least one object capable of receiving input from the user; and the method further comprises (or the information storage device/medium further stores instructions that when executed by the computer processor effect—as the case may be), (a) receiving by the at least one server from the client device, (of) at least one of an indication that the user has input information into at least one of the at least one object and information that the user has input into at least one of the at least one object. In some embodiments, after receipt of at least one of (i) the indication that at least one of the at least one user-selected object has been selected, and (ii) at least one of an indication that the user has input information into at least one of the at least one object and information that the user has input into at least one of the at least one object, the method further comprises (or the information storage device/medium further stores instructions that when executed by the computer processor effect— as the case may be), (a) taking (of) an action via the at least one server in consequence.

The information other than from the publisher of the then current network resource may be sent from the server(s) from which the then current network resource was sent. Thus, in some embodiments, information from other than the publisher of the network resource is received via, at least in part, the at least one server.

This is not necessarily the case however, and the information other than from the publisher of the then current network resource may be send from different server(s) from those from which the client device was sent the then current network resource. Thus, in some embodiments, the at least one server is different from a server that is to furnish the network resource to the client device.

In those embodiments, the use of the address bar to display the information from other than the publisher of the then current resources, may allow for the display of information without having to otherwise alter the display of information within the display window of the browser (which is generally not the case when pop-ups, additional display lines, bars, etc. are used). Thus, in some embodiments, a size of the address bar is not altered by displaying the information from other than the publisher within the address bar. And, in some embodiments, display of information within the browser other than within the address bar is not altered by displaying the information from other than the publisher within the address bar. Thus, depending on the configuration of the browser and the circumstances, the present technology may allow for the display of information to user, without altering the display of the then current resource and without opening any additional pop-up windows, etc. This may allow for a situation that is more visually pleasing to the user, or allow for the display of information that could not otherwise be displayed (e.g. in a situation where the remainder of the screen could not be altered because of the information that is then currently being displayed).

In some embodiments, the information from other than the publisher of the network resource emanates from, at least in part, the publisher of the browser. And, in some embodiments, the information from other than the publisher of the network resource is received via, at least in part, the publisher of the browser. Thus, in some embodiments the address bar of a browser of the present technology may be used to provide a space within the browser that the publisher of the browser (as opposed to the publisher of a particular network resource—which is conventionally the case) may use to display information.

Thus, in some embodiments, the information from other than the publisher of the network resource includes advertising information. As was discussed briefly hereinabove, typically the information displayed in the display window of a browser is information from the publisher of the then current network resource being accessed. Thus, for example, advertising information displayed in a display window is under the control of the publisher of the then current network resource being accessed. The use of the present technology may allow, depending on the circumstances, for the publisher of the browser to present (or cause to be presented) advertising information separate and apart from any advertising information that is being caused to be displayed by the publisher of the then current network resource being accessed—which as was referred to hereinabove may be without disturbing the actual display of information (including advertising information) in the display window.

In some embodiments, the information from other than the publisher of the network resource includes status information, typically other than the type that is conventionally displayed in the status bar. In some such embodiments, the status information includes status information with respect to the network resource. For example, such embodiments may include embodiments where errors, such HTTP errors (e.g. 400, 401, 402, 403, 404, etc.) are displayed. In some such embodiments, the status information includes status information with respect to the browser. For example, such embodiments may include embodiments where instead of a pop-up dialog box the user is presented with similar information and/or choices in the address bar—e.g. an open, save, or cancel choice with respect to the downloading of a network resource. In some such embodiments, the status information is status information with respect to other than the network resource and the browser. For example, such embodiments may include embodiments where the user is presented with the possibility of employing additional services with respect to the then current network resource (e.g. translation services, mapping services, etc.)

In some embodiments, the information from other than the publisher of the network resource includes navigation information for navigating within the network resource. For example, the user-selected objects described in International Application No. PCT/RU2012/000800, filed Oct. 1, 2012 by Yandex A. G. et al., entitled "Method and System for Navigating to a Sub-Resource of an Internet Resource" (incorporated by reference herein in its entirety in all jurisdictions allowing for incorporation by reference), could be displayed in the address bar and used for navigation as described in that application.

In some embodiments, the information from other than the publisher of the network resource includes historical navigation information. In the present context, historical navigation information includes, for example, embodiments where displayed in the address bar are the various previous network "locations" the user had visited (typically in reverse chronological order) immediately prior to the then current network resource. Each of those "locations" may be user-selected to allow the user to return to such a resource by selecting an object representing such locations.

In some such embodiments, the historical navigation information includes a searched search term. In many situations, when a user is seeking a particular network resource, the user will begin with a search (e.g. via search engine by sending a search query include various search terms to the search engine). In some embodiments, when displaying the historical navigation information, rather than display the URL of the search engine (which is likely to be unhelpful to the user), one or more of the actual search terms may be displayed in the historical navigation information in the address bar (which is likely to be more helpful to the user). This may be made possible, for example, in situations where the publisher of the browser and the operator of the search engine are the same entity or cooperate to achieve this result, or where the browser has been configured to locally store this information for presentation to the user.

In some such embodiments, the historical navigation information includes references to network resources other than the network resource. This will be the case, for example, when, as was described above, the user has taken a path across more than one network resource to reach the then current network resource, and the browser is configured to be able to display such historical information.

In some such embodiments, the historical navigation information is displayed in a breadcrumb format.

In some embodiments, the information from other than the publisher of the website includes a request for instructions from the user of the client device. Examples of such situations were provided herein above.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Example Environment

Figure 2:
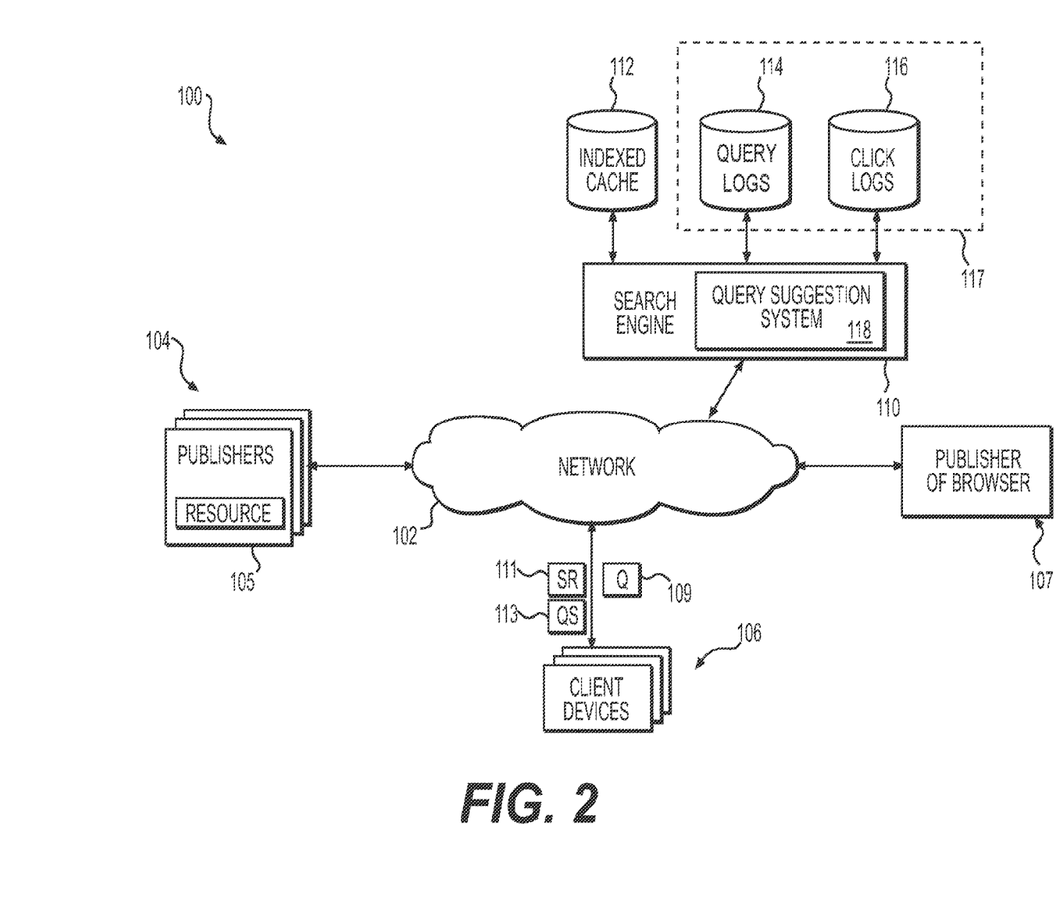
FIG. 2 is a block diagram of a example computing environment.

FIG. 2 is a block diagram of an example online environment 100 in which a client device 106 communicates with servers 104 to request and receive network resources 105. A computer network 102, such as a local area network (LAN), wide area network (WAN), the Internet, or a combination thereof, connects publisher web sites (running on servers 104) and the client device 106. The online environment 100 may include many thousands of publisher web sites and client devices 106, as well other services such as search engines (will be described in more detail herein below). The online environment 100 may also include the publisher 107 of the browser being used with respect to the online environment 100.

A web site is a one or more network resources 105 associated with a domain name (an example of a URL), and each web site is hosted by one or more servers (104). An example web site is a collection of web pages formatted in hypertext markup language (HTML) that can contain text, graphic images, multimedia content, and programming elements, such as scripts. Each web site is maintained by a publisher, e.g., an entity that manages and/or owns the web site and its content.

To facilitate searching of the network resources 105, a search engine 110 identifies the resources by crawling the publisher web sites and indexing the resources provided by the publisher web sites, as is known in the art.

The client devices 106 submit search queries 109 to the search engine 110. The search queries 109 are submitted in the form of various search request elements (not individually shown). The search request elements, may include search terms (made up of letters, characters, numbers, etc.), a unique identifier of the client device or of a user account logged in on the client device, the location of the client device, the time of the client device, etc.

In response to receiving a search result in respect of a search query 109, the search engine 110 uses the indexed cache 112 to identify resources that are relevant to the query. The search engine 110 identifies the resources in the form of search results 111 and returns the search results to the client device 106 in search results page resource. A search result is data generated by the search engine 110 that identifies a resource that satisfies a particular search query, and includes a uniform resource locator for the resource. An example search result may include a web page title, a snippet of text extracted from the web page, and the URL of the web page.

The client devices 106 receive the search results pages and render the pages for presentation to users. In response to the user selecting a search result at a client device 106, the client device 106 requests the resource identified by the URL included in the selected search result. The publisher of the web site 104 hosting the resource receives the request for the resource from the client device 106 and provides the resource to the requesting client device 106.

In some implementations, the queries 109 submitted from client devices 106 are stored in query logs 114. Click data for the queries and the web pages referenced by the search results are stored in click logs 116. The query logs 114 and the click logs 116 define search history data 117 that include data from and related to previous search requests associated with unique identifiers associated with users performing the searches. The click logs 116 define actions taken responsive to search results provided by the search engine 110. The query logs 114 and click logs 116 can be used to map queries submitted by the client devices 106 to web pages that were identified in search results and the actions taken by users (i.e., that data are associated with the identifiers from the search requests so that a search history for each identifier can be accessed). The click logs 116 and query logs 114 can thus be used by the search engine 110 to determine the sequence of queries submitted by the client devices 106, the actions taken in response to the queries, and how often the queries are submitted.

Embodiments

Figure 3:
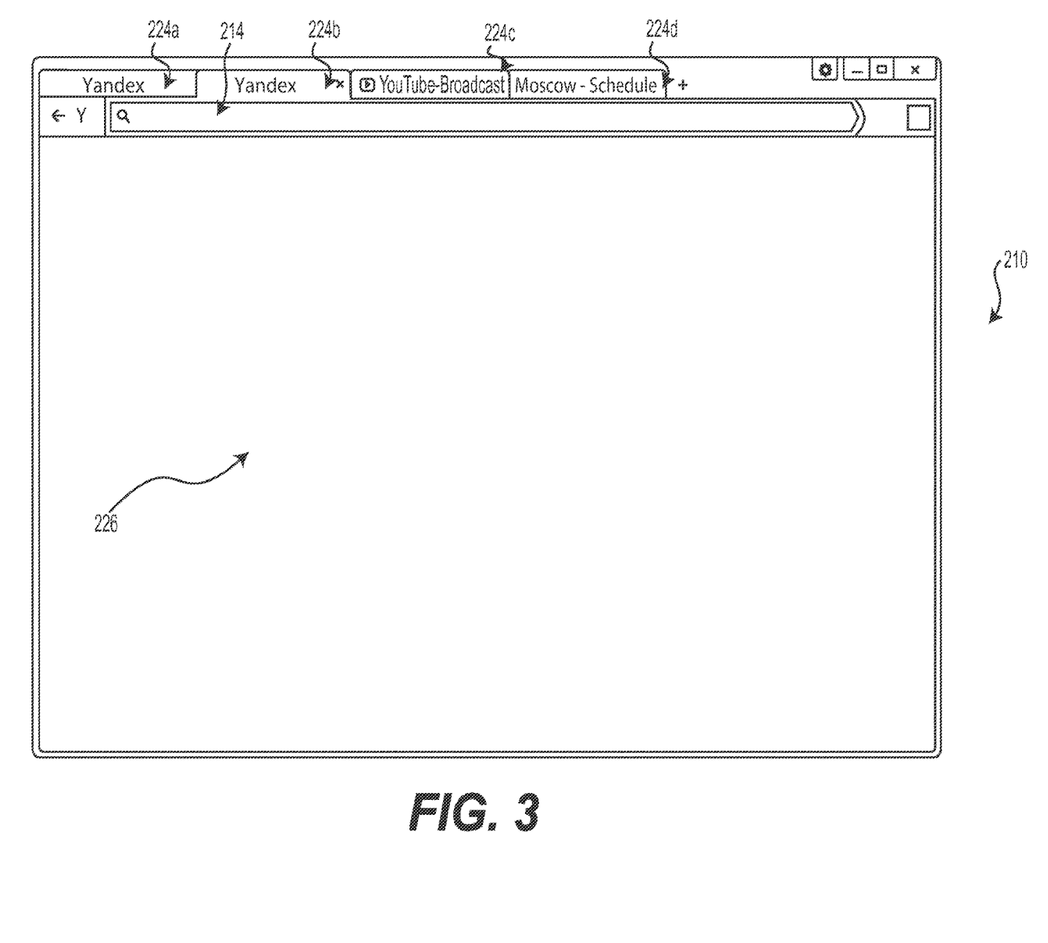
FIG. 3 is a view of a browser, prior to entry of information in the address bar.

FIG. 3 shows an embodiment of the present technology, being a browser 210 (running within the Microsoft™ Windows™ operating system on an Intel™-processor based personal computer—a client device 106). Browser 210 has an address bar 214 (which also functions as a search bar), a series of tabs 224a, 224b, 224c, 224d (of which tab 224b has been selected), and a display window 226. In this figure, no text has been entered into the address bar 214 and there is no then current network resource.

Figure 4:
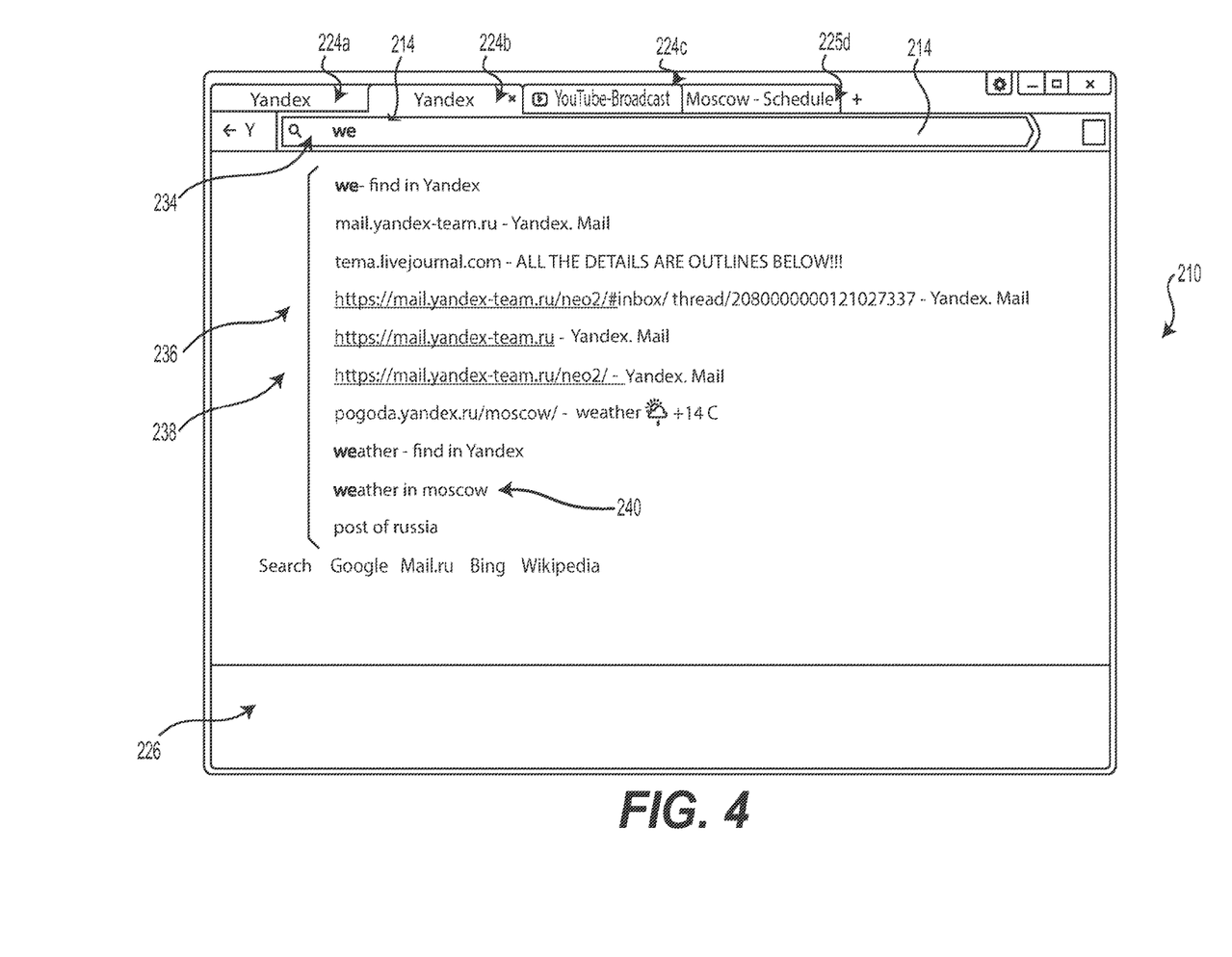
FIG. 4 is a view of the browser of FIG. 3, wherein the user has started to enter characters in the address bar.

FIG. 4 is similar to FIG. 3, however the user has entered into the address bar 214 the Cyrillic letters по (shown in the Fig. as reference 234). As, in this embodiment, the address bar 214 also functions as a search bar, a drop-down window 236 has opened, and a combined list 238 of suggested search queries and possible network resources (being represented by the URL's listed in the window 236) appears. In this particular case, the user was searching for the then current weather in Moscow, Russia. One suggested search query, погода в москве (shown in the Fig. as reference 240) is what the user was looking for. The user selects that suggested search query (not shown). That search query is then sent via the Internet to the Yandex™ search engine.

Figure 5:
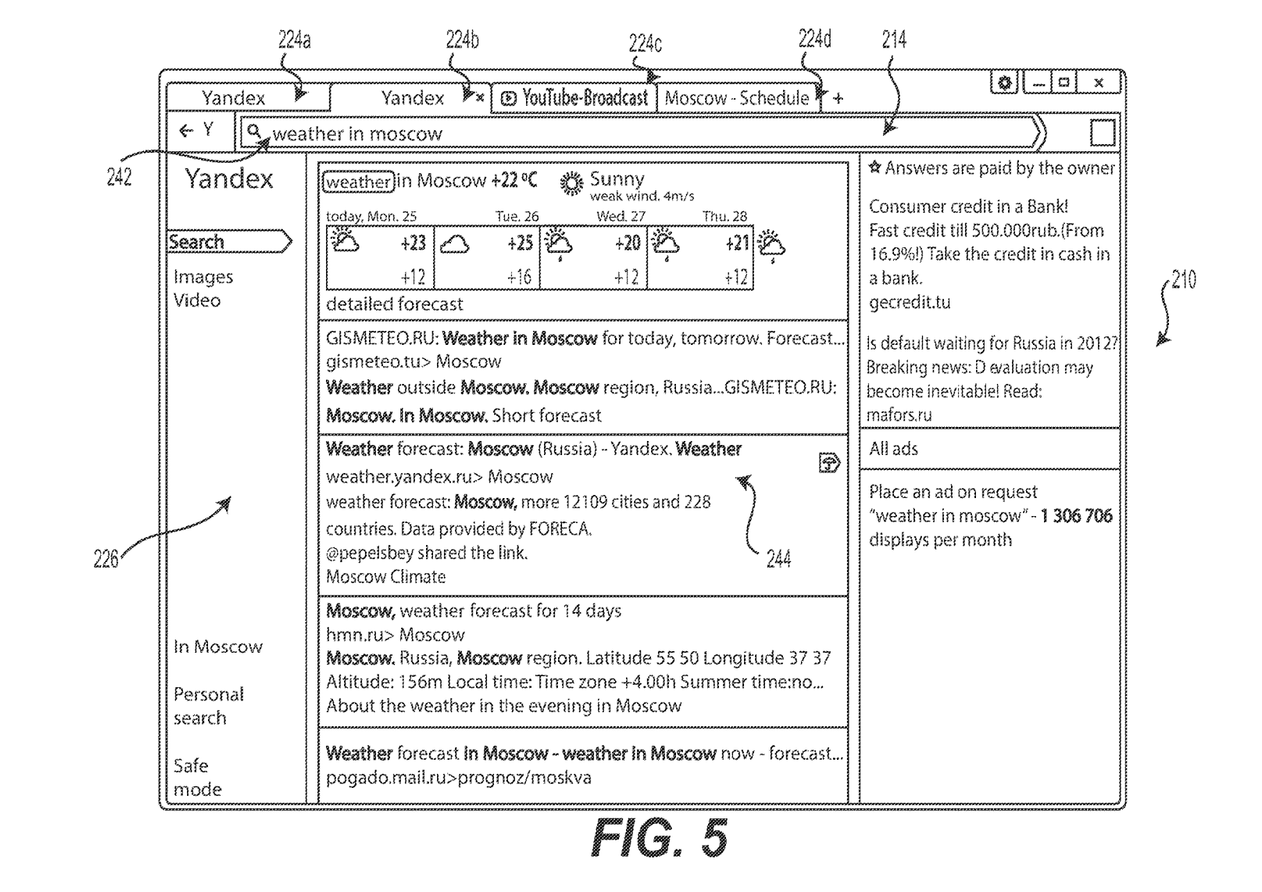
FIG. 5 is a view of the browser of FIG. 4, wherein the user has requested a search from a search engine, showing a search result page.

The search results of the user's selection in FIG. 4 that are returned by the Yandex™ search engine's servers are shown in the display window 226 of the browser 210 in FIG. 5. In FIG. 5. The actual search term 'погода в москве' (as opposed to a link) now appears in the address bar as the then current network resource. In this example, it is the second result—or "hit" (shown as reference 244) in the search results that the user is seeking. This result corresponds to the погода в москве (weather in Moscow) page on located at the URL pogoda.yandex.ru, and the user selects it.

Figure 6:
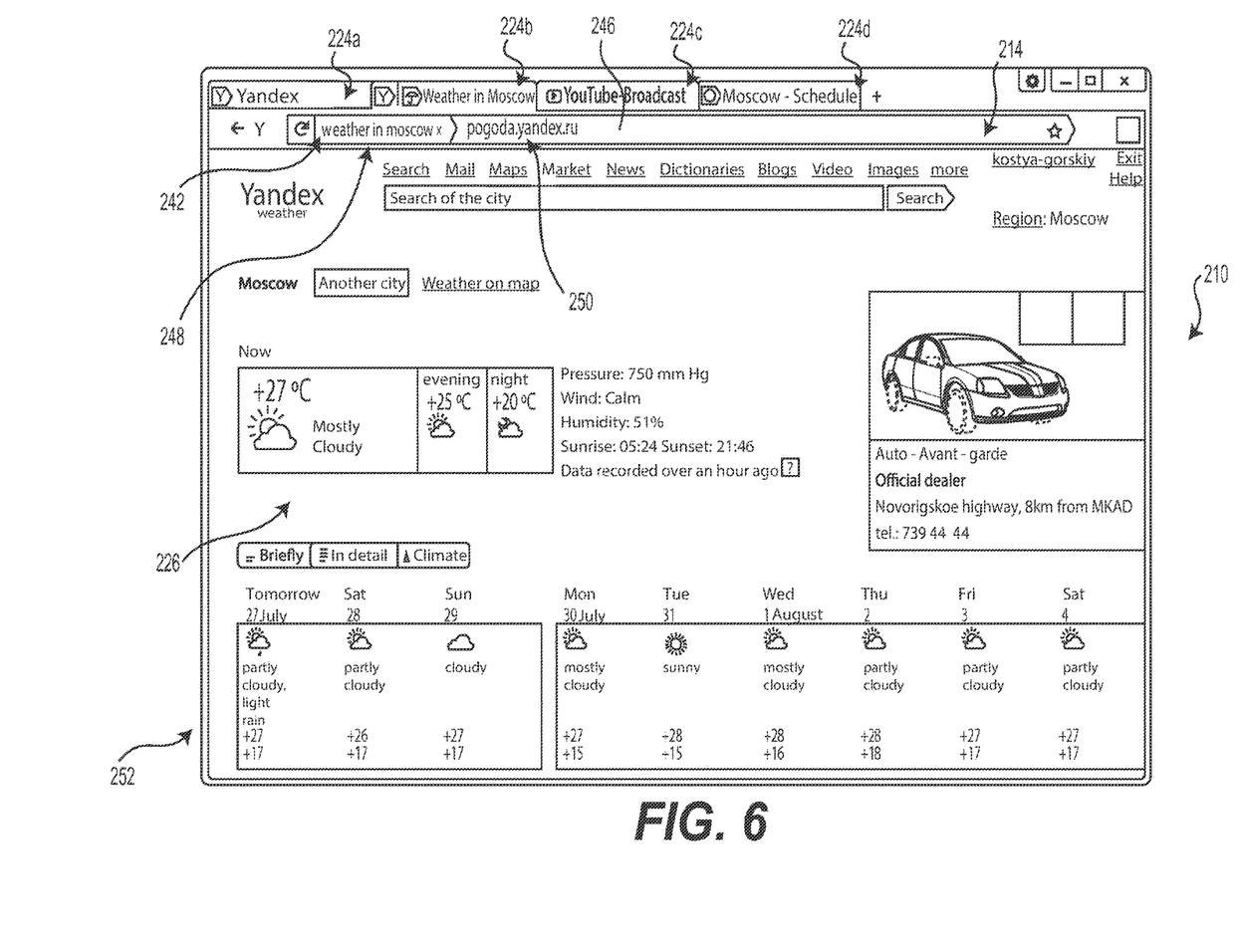
FIG. 6 is a view of the browser of FIG. 5, wherein the user has navigate to a result from the search result page, showing the selected network resource.

In FIG. 6, the results of the user's selection are displayed. The then current network resource is the main page of the Yandex weather page (at pogoda.yandex.ru). (In this particular case, the main page of the Yandex weather page is dynamic and will always display the weather for the city in which the user is located. Since in the "user" in this example is located in Moscow, there is no need to display a separate weather page for Moscow.) Displayed in the address bar 214 in breadcrumb format (starting from the left) is the historical navigation information 246 for the then current network resource. In this respect, in arrow 248 is the search term 242 погода в москве , followed by the then current network resource 250 pogoda.yandex.ru. This is the entire history for the then current resource as it was only one "click" away from the search. It should be noted again, that the actual search term "погода в москве " (as opposed to a link) appears in the address bar. The arrow 248 in which that search term appears is a user-selectable object that, if selected by the user, will return the user to the results page for that search term. (In this FIG. 6, a results page 252 is shown as being overlain by the current display window 226, in accordance with the technology described in International Application No. PCT/RU2012/000799, filed Oct. 1, 2012 by Yandex A. G. et al., entitled "Method and Browser for Displaying Overlaid Webpages" (incorporated by reference herein in its entirety in all jurisdictions allowing for incorporation by reference). While the technology described in that application is useful in combination with the present technology, such combination is not required for either.) The historical navigation information 246 may either be stored locally and/or remotely (on the server(s) of either the publisher of the browser and/or those of the operator of the search engine).

Figure 7:
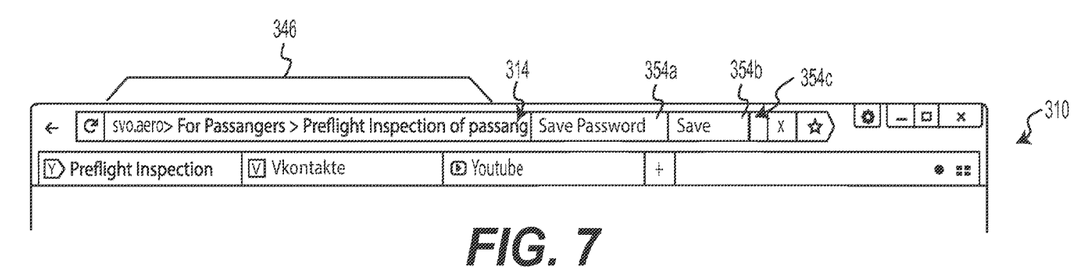
FIG. 7 is partial view of a browser showing an address bar being an embodiment.
Figure 8:
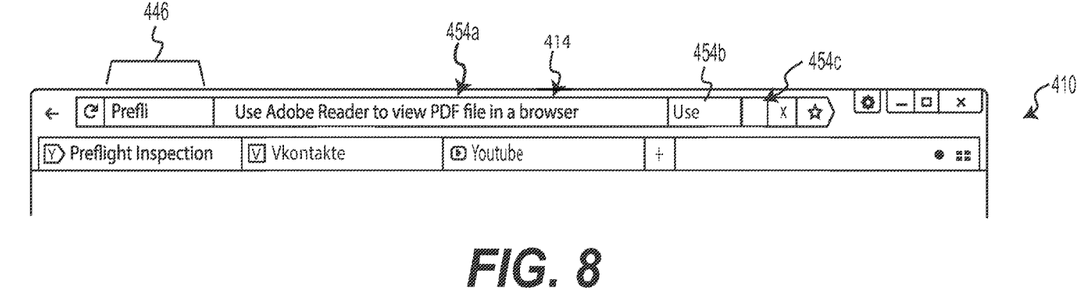
FIG. 8 is partial view of a browser showing an address bar being an embodiment.
Figure 9:
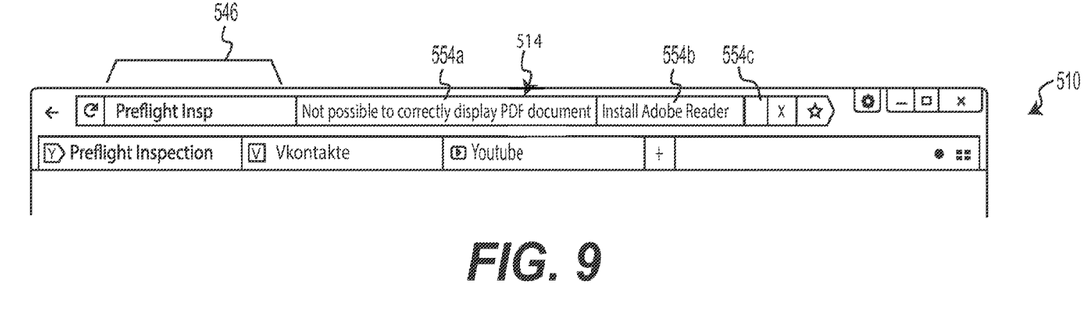
FIG. 9 is partial view of a browser showing an address bar being an embodiment.

Other embodiments of the present technology are shown in FIGS. 7, 8, and 9.

In FIG. 7, in addition to displaying a historical navigation information 346, also displayed in the address bar 314 in the form of three different objects 354a, 354b, 354c are information from the browser 310 itself (and not from the publisher of the then current network resource). Object 354a is a non-user selectable object that queries the user (in this particular case) whether or not the password for the then current network resource should be saved. Object 354b is a user-selectable object that if selected, will cause that password to be saved by the browser. Object 354c is a user-selectable object, that, if selected, will cause a drop-down box to appear providing the user with additional selections with respect to the saving of the password. The objects 354a, 354b, 354c, are displayed in the address bar 314 having overwritten of the historical navigation information including part of the URL of the then current network resource. Neither the size of the address bar nor the display of the then current resource has changed as a result of the objects 354a, 354b, 354c have been displayed.

In FIG. 8, in addition to displaying the historical navigation information 446, also displayed in the address bar 414 in the form of three different objects 454a, 454b, 454c are information from the browser 410 itself (and not from the publisher of the then current network resource). Object 454a is a non-user selectable object that queries the user (in this particular case) whether or not Adobe™ Acrobat™ reader should be used to open a PDF file within the browser 410. Object 454b is a user-selectable object, that, if selected, will cause that PDF file to be so opened by the browser. Object 454c is a user-selectable object, that, if selected, will cause a drop-down box to appear providing the user with additional selections with respect to the opening of the PDF file. The objects 454a, 454b, 454c, are displayed in the address bar 414 having overwritten of the historical navigation information including all of the URL of the then current network resource. Neither the size of the address bar nor the display of the then current resource has changed as a result of the objects 454a, 454b, 454c have been displayed.

In FIG. 9, in addition to displaying the historical navigation information 546, also displayed in the address bar 514 in the form of three different objects 554a, 554b, 554c are information from the browser 410 itself (and not from the publisher of the then current network resource). Object 554a is a non-user selectable object that informs the user (in this particular case) that it is not possible to correctly display a PDF file within the browser 510. Object 554b is a user-selectable object, that if selected, will cause Adobe™ Acrobat™ reader to be installed. Object 554c is a user-selectable object that if selected, will cause a drop-down box to appear providing the user with additional selections with respect to the opening of the PDF file. The objects 554a, 554b, 554c, are displayed in the address bar 514 having overwritten of the historical navigation information including all of the URL of the then current network resource. Neither the size of the address bar nor the display of the then current resource has changed as a result of the objects 554a, 554b, 554c have been displayed.

Additional Implementation Details

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include client devices and servers. A client device and server are generally remote from each other and typically interact through a communication network. The relationship of client device and server arises by virtue of computer programs running on the respective computers and having a client-server relationship to each other.

The invention claimed is:

1. A method of providing information to a user of a client device:
   displaying, on a screen of the client device, a browser having an address bar;
   in response to a search request with a searched search term, displaying a search results page on the screen of the client device within the browser, the search results page having been generated based on the searched search term;
   receiving, from the user of the client device via the browser, an indication of a network resource to be furnished to the client device, the indication having been generated in response to user interaction with the search results page by selecting the network resource;
   sending, from the client device to at least one server, a request to furnish the network resource to the client device;
   receiving, by the client device from the at least one server, the network resource and information regarding the network resource;
   displaying, on the screen of the client device, the network resource and the information regarding the network resource; and
   displaying, on the screen of the client device, within the address bar of the browser, information from other than the publisher of the network resource,
   wherein the information from other than the publisher of the network resource includes historical navigation information,
   the historical navigation information including
      a first user-selectable object displaying the searched search term that led to the network resource being displayed, the first user-selectable object being configured to cause displaying of the search results page for the searched search term in response to being selected by the user, and
      second user-selectable objects displaying references to network resources, other than the network resource, the network resources having been selected by the user following the search results page and displayed following the search results page, the second user-selectable objects:
         (i) being displayed simultaneously with each other and the first user-selectable object and
         (ii) being selectable independently from each other and the first user-selectable object, and
         each second user-selectable object being configured, in response to being selected by the user, to cause returning to a network resource page of the network resource, and
   the historical navigation information being displayed in a breadcrumb format within the address bar of the browser.

2. The method of claim 1,
wherein receiving, by the client device from the at least one server, the network resource and the information regarding the network resource, is, receiving, by the client device from the at least one server, the network resource; and
further comprising,
   displaying the network resource within the browser on the screen of the client device, and
   displaying a uniform resource locator (URL) of the network resource within the address bar of the browser on the screen of the client device;
and wherein displaying, on the screen of the client device, within the address bar of the browser, the information from other than the publisher of the network resource, is displaying, on the screen of the client device, within the address bar of the browser the information from other than the publisher of the network resource, while displaying at least part of the URL of the network resource within the address bar of the browser.

3. The method of claim 1,
wherein receiving, by the client device from the at least one server, the network resource and the information regarding the network resource, is, receiving, by the client device from the at least one server, the network resource; and
further comprising,
   displaying the network resource within the browser on the screen of the client device, and
   displaying a URL of the network resource within the address bar of the browser on the screen of the client device;
and wherein displaying, on the screen of the client device, within the address bar of the browser, the information from other than the publisher of the network resource, is displaying, on the screen of the client device, within the address bar of the browser the information from other than the publisher of the network resource in place of the URL of the network resource within the address bar of the browser.

4. The method of claim 1, wherein a size of the address bar is not altered by displaying the information from other than the publisher within the address bar.

5. The method of claim 1, wherein display of information within the browser other than within the address bar is not altered by displaying the information from other than the publisher within the address bar.

6. The method of claim 1, further comprising ceasing to display the information from other than the publisher of the network resource including the historical navigation information in the address bar.

7. The method of claim 1, further comprising taking an action via the client device as a consequence of the user selecting one of the first user-selectable object and the second user-selectable objects.

8. The method of claim 1, wherein the information from other than the publisher of the network resource includes information regarding at least one object capable of receiving input from the user; and further comprising taking an action via the client device as a consequence of user input into at least one of the at least one object.

9. The method of claim 1,
wherein the at least one server is a first server; and
further comprising, prior to displaying on the screen of the client device within the address bar of the browser information from other than the publisher of the network resource:
sending, from the client device to a second server, a request for the information from other than the publisher of the network resource; and
receiving, by the client device from the second server, the information from other than the publisher of the network resource.

10. The method of claim 1, wherein the information from other than the publisher of the network resource is received via, at least in part, the at least one server.

11. The method of claim 1, wherein the information from other than the publisher of the network resource is generated by, at least in part, the browser.

12. The method of claim 1, wherein the information from other than the publisher of the network resource emanates from, at least in part, a publisher of the browser.

13. The method of claim 1, wherein the information from other than the publisher of the network resource is received via, at least in part, a publisher of the browser.

14. The method of claim 1, wherein the information from other than the publisher of the network resource includes status information.

15. The method of claim 14, wherein the status information includes status information with respect to the network resource.

16. The method of claim 14, wherein the status information includes status information with respect to the browser.

17. The method of claim 14, wherein the status information is status information with respect to other than the network resource and the browser.

18. The method of claim 1, wherein the information from other than the publisher of the network resource includes navigation information for navigating within the network resource.

19. The method of claim 1, wherein the information from other than the publisher of the network resource includes a request for instructions from the user of the client device.

20. A method of providing information to a user of a client device having a browser:
in response to a search request with a searched search term, displaying a search results page on a screen of the client device within the browser, the search results page having been generated based on the searched search term;
receiving, by at least one server from the client device via the browser, an indication of a network resource to be furnished to the client device, the indication having been generated in response to user interaction with the search results page by selecting the network resource; and
sending, by the at least one server to the client device, information from other than the publisher of the network resource, including historical navigation information, to be displayed in a breadcrumb format within an address bar of the browser,
the historical navigation information including
a first user-selectable object displaying the searched search term that led to the network resource being displayed, the first user-selectable object being configured to cause displaying of the search results page for the searched search term in response to being selected by the user, and
second user-selectable objects displaying references to network resources other than the network resource, the network resources having been selected by the user following the search results page and displayed following the search results page, the second user-selectable objects
(i) being displayed simultaneously with each other and the first user-selectable object and
(ii) being selectable independently from each other and the first user-selectable object, and
each second user-selectable object being configured, in response to being selected by the user, to cause returning to a network resource page of the network resource.

* * * * *